Figure 2:
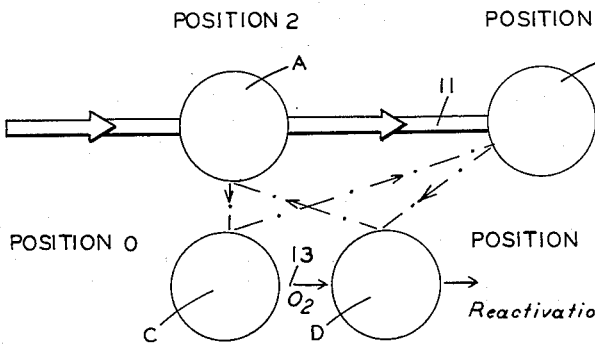

Jan. 10, 1961  A. STEDING ET AL  2,967,587
PROCESS AND APPARATUS FOR DRY-PROCESS ADSORPTION
OF HYDROGEN SULFIDE FROM COKE-OVEN GASES
Filed March 25, 1958

ARTHUR STEDING
RUDOLF MÜLLER
*INVENTORS*

BY

*AGENT*

United States Patent Office 2,967,587
Patented Jan. 10, 1961

2,967,587

PROCESS AND APPARATUS FOR DRY-PROCESS ADSORPTION OF HYDROGEN SULFIDE FROM COKE-OVEN GASES

Arthur Steding and Rudolf Müller, Essen, Germany, assignors to Didier-Werke A.G., Wiesbaden, Germany, a corporation of Germany Filed Mar. 25, 1958, Ser. No. 723,791

Claims priority, application Germany Mar. 29, 1957

4 Claims. (Cl. 183—114.2)

This invention relates to a process for removing residual amounts of hydrogen sulfide from coke-oven gases or the like and to equipment for this purpose.

In the usual practice, coke-oven distillation gases are sent through a series of wet-process scrubbers containing aqueous ammonia, alkazid solution, peroxide solution, aqueous potassium hydroxide, or the like, in order to remove most of the hydrogen sulfide from these gases. A small residue of the gaseous sulfide remains, however, and must be removed along with the residual moisture if the gases are to be used for illuminating and heating purposes. Such removal is generally accomplished by passing the gases under pressure through towers containing suitable solid adsorption and/or drying agents.

It would be advantageous to reprocess the spent adsorbent for its sulfur content, but the amount of $H_2S$ in the distillation gases is so small after the wet-process scrubbing— about 2 g./100 m.$^3$ (reduced to 1 atm. and 0° C.)—that its concentration in the adsorbent is usually not greater than 20% to 25%. The reason for this low yield appears to be that at this point the adsorbent has no further affinity for trace amounts of sulfide, particularly at the high pressure and relatively rapid flow rate of the illuminating-gas stream. As a result, recovery of the sulfide from the adsorbent is uneconomical.

A principal object of this invention is to provide a mode of operation for a combination of dry-process adsorption units so that the concentration of hydrogen sulfide in the adsorbent material reaches 35%–40% or more, making it commercially feasible to work up this material for its sulfur content.

Another object of the invention is to provide a novel arrangement of gas-processing units or towers enabling maximum enrichment of an adsorbent with sulfur.

A feature of the invention is that following the maximum removal of $H_2S$ from a gas of low sulfur content (e.g. illuminating gas) by the adsorbent, i.e. after the concentration of hydrogen sulfide in the adsorbent has reached an upper limit of 20% to 25%, the unit containing the adsorbent is switched into a stream of gas (e.g. undergrate furnace gas or draft gas) which is relatively rich in oxygen and hydrogen sulfide, thereby raising the sulfide content of the adsorbent to 35%–40%. Since the presence of oxygen has been found to increase appreciably the capacity of the customary adsorbents, this latter gas may be specifically enriched with oxygen, if necessary.

A further feature of the invention is the provision of equipment for carrying out the above process, comprising a plurality of adsorbent towers so arranged that they can be switched at will from the main gas line to the draft-gas line to accomplish the purpose of the invention.

Figure 1:
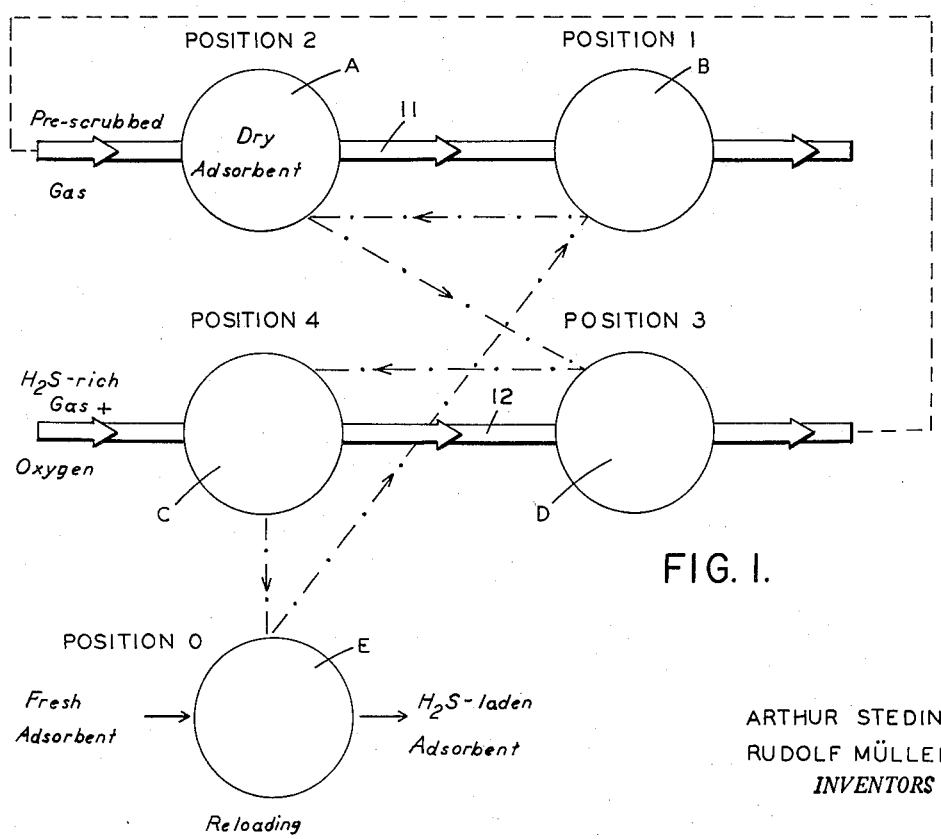

The above objects and features and the details of our improved process and its associated apparatus will be more clearly understood from the following description given with reference to the accompanying drawing Fig. 1 of which represents a top view of a gas-processing plant embodying the invention while Fig. 2 illustrates a modification.

The plant schematically illustrated in Fig. 1 comprises a plurality of adsorbing towers, designated A–E, in which a gas stream containing hydrogen sulfide is brought into contact with an active mass for a sufficient length of time to give up a considerable proportion of the sulfide. Units of this description are known per se and their specific construction is immaterial for understanding of the present invention.

Fig. 1 also shows five operating positions respectively designated 0, 1, 2, 3 and 4. Positions 1 and 2 are serially included in a line 11 carrying pre-scrubbed gas containing a relatively small portion of $H_2S$ and, generally, little or no oxygen, the latter being particularly true in the case of illuminating gas in which it is desirable to remove the oxygen during the preliminary wet-scrubbing operation in order to avoid objectionable reactions with such trace admixtures as nitrogen oxides, hydrogen cyanide and acetylene. Positions 3 and 4 are similarly included in a line 12 carrying a gas rich in both $H_2S$ and oxygen, such as a furnace draft gas. Position 0 is by-passed by both lines 11, 12 and represents a repacking station for the removal of the sulfur-laden mass from a tower and for its recharging with fresh adsorbent.

In operation, a freshly packed tower (B in Fig. 1) is transferred from position 0 to position 1 while simultaneously the other towers (A, D, C, E) are respectively advanced into positions 2, 3, 4 and 0. Thus, the fresh adsorbent is so stationed as to be in contact with the gas having the least content of residual hydrogen sulfide, the fresh adsorbent and the adsorbents in further stages of $H_2S$ enrichment being then moved step by step (first upstream along pipe 11, then upstream along pipe 12) into positions of progressively higher sulfide content of the encountered gas until they finally leave the gas stream at position 0. It should be noted that the downstream positions on each line encounter lower sulfide concentrations than the upstream positions, owing to the preliminary purification which the gas undergoes in passing through an upstream location on its way to a downstream location. In this manner a maximum enrichment of the adsorbent is made possible; at the same time the stationing of the fresh mass on the downstream side of line 11 serves as a safeguard against the accidental discharge of hydrogen sulfide into the illuminating-gas stream.

It should be understood that the transfer of towers A–E between positions 0–4 is described above, and as diagrammatically illustrated in Fig. 1, need not be a physical shift but may also be realized by a suitable successive switching of connections between the towers and the lines 11, 12 through an appropriate valve system, it being merely necessary for this purpose to provide each line section with a plurality of branches respectively leading to the several towers which are to be selectively connected thereto.

In Fig. 2 we have shown a modified system according to the invention in which the adsorbent, after having been stationed at position 1, is contacted with an oxygen stream in a pipe 13 (position 1a) before being transferred to position 2 and thence to the reloading station (position 0). This latter type of arrangement will be desirable where the entire gas output of the plant is to be used for illumination or for other purposes requiring substantial absence of oxygen; it will be noted that position 1a represents a reactivating station which is by-passed by the gas of line 11.

On the other hand, it will also be possible to pass the same gas stream through both pipes 11 and 12 if the presence of oxygen in the output of the plant is not objectionable; this may be accomplished by the connection between the downstream end of pipe 12 and the upstream end of pipe 11 as illustrated in dotted lines in Fig. 1.

A suitable solid adsorbing agent, capable of being reactivated by the presence of oxygen to increase its H₂S-adsorption capacity, is powdered iron oxide which may be incorporated in a bed of wood shavings or the like, with or without an admixture of lime.

We claim:

1. A process for enriching an adsorbent with hydrogen sulfide, comprising the steps of first placing said adsorbent in contact with an illuminating gas of relatively low H₂S content and thereafter contacting said adsorbent with a furnace draft gas of relatively high H₂S content, said adsorbent being first placed in a downstream position of a stream of said illuminating gas, then transferred to an upstream position of the same gas stream, thereafter placed in a downstream position of a stream of said furnace draft gas, and finally transferred to an upstream position of the last-mentioned gas stream.

2. A process according to claim 1 which comprises the further step of admixing oxygen with said furnace draft gas.

3. A process for enriching an adsorbent with hydrogen sulfide, comprising the steps of first placing said adsorbent in contact with a gas of relatively low H₂S content substantially free of oxygen and thereafter contacting said adsorbent with a gas of relatively high H₂S content rich in oxygen, said adsorbent being first placed in a downstream position of a stream of said gas having a low H₂S content, then transferred to an upstream position of the same gas stream, thereafter placed in a downstream position of a stream of said gas having a high H₂S content, and finally transferred to an upstream position of the last-mentioned gas stream.

4. A process for enriching an adsorbent with hydrogen sulfide, comprising the steps of first placing said adsorbent in contact with a gas of relatively low H₂S content, reactivating said adsorbent with oxygen, and thereafter contacting said adsorbent with a gas of relatively high H₂S content, said adsorbent being first placed in a downstream position of a stream of said gas having a low H₂S content, then transferred to an upstream position of the same gas stream, thereafter placed in a downstream position of a stream of said gas having a high H₂S content, and finally transferred to an upstream position of the last-mentioned gas stream.

References Cited in the file of this patent

UNITED STATES PATENTS

| | | |
|---|---|---|
| 1,872,783 | Miller | Aug. 23, 1932 |
| 2,017,779 | Vosburgh | Oct. 15, 1935 |
| 2,799,361 | Miller | July 16, 1957 |